United States Patent [19]

Dietrick et al.

[11] Patent Number: 4,773,992

[45] Date of Patent: Sep. 27, 1988

[54] CENTRIFUGE SYSTEM FOR REMOVING IMPURITIES FROM METAL WORKING COOLANT

[75] Inventors: Gerald P. Dietrick, Boone County; Curtis C. Wuellner, Florence, both of Ky.

[73] Assignee: Dietrick Sales & Service, Inc., Florence, Ky.

[21] Appl. No.: 20,531

[22] Filed: Mar. 2, 1987

[51] Int. Cl.4 ...................... B01D 36/00; B04B 11/04; B04B 1/14

[52] U.S. Cl. .................................... 210/112; 210/138; 210/167; 210/195.1; 210/257.1; 210/259; 210/295; 494/2; 494/11; 494/35

[58] Field of Search ............ 210/167, 168, 138, 257.1, 210/258, 259, 295, 297, 300, 302, 305, 307, 195.1, 112-114; 494/2, 11, 35, 36, 42, 901

[56] References Cited

U.S. PATENT DOCUMENTS 3,160,589 12/1964 Stone .................................... 494/11
3,204,868 9/1965 Honeychurch ........................ 494/35
3,255,958 6/1966 Simon .................................. 494/35
3,272,430 9/1966 Thylefors ............................. 494/11
4,643,709 2/1987 Lee et al. ............................. 494/35

OTHER PUBLICATIONS

Philipbar, "Centrifugation: A New Standard for Coolant Purification", *Cutting Tool Engineering Magazine*, Oct. 1985.

*Primary Examiner*—Richard V. Fisher
*Assistant Examiner*—Linda Evans
*Attorney, Agent, or Firm*—James W. Pearce; Roy F. Schaeperklaus

[57] ABSTRACT

A centrifuge system for removing impurities from metal working coolant. The centrifuge of the system includes a liquid inlet, a first liquid outlet for high density liquid, a second liquid outlet for low density liquid, a discharge means for a shoot of particulate material, and a pressure port for receiving liquid under pressure to cause the shoot. A line receives high density liquid from the first liquid outlet. The line discharges into a tank. A branch line connects the line to the pressure port. A valve in the line can stop flow to the tank. When the valve is closed, pressure at the pressure port is increased to cause the shoot.

8 Claims, 2 Drawing Sheets

CENTRIFUGE SYSTEM FOR REMOVING IMPURITIES FROM METAL WORKING COOLANT

BACKGROUND OF THE INVENTION

This invention relates to removal of impurities from metal working coolant and the like. More particularly, this invention relates to a centrifuge system for removing such impurities.

Coolant must be cleaned and purified to remove metal chips and fines and to remove tramp oils.

Coolant purifying systems are known in which a filtration system removes gross solids and in which tramp oil is separated in a centrifuge such as the Alfa-Laval centrifuge WSPX-204. In this type of centrifuge, clean coolant and tramp oil are separated by reason of differing specific gravities and are pumped from the centrifuge. Solids collect in an outer portion of a bowl assembly of the centrifuge and, at predetermined intervals, allowed to "shoot" or vacate the bowl assembly automatically. The shoot is accomplished in a split second opening of the bowl assembly while the centrifuge is running. Power for causing the opening of the bowl assembly is secured from operating liquid which is introduced under pressure through an operating liquid opening of the centrifuge. The operating liquid can be outside water, which passes into the centrifuge and is discharged from the centrifuge with centrifuged coolant. Mixing of the outside water with the centrifuged coolant introduces impurities into the coolant from the outside water. An object of this invention is to provide a coolant cleaning system which does not introduce impurities from outside liquid into the coolant cleaning system.

A further object of this invention is to provide a coolant purifying system in which clean coolant from the centrifuge is used as the operating liquid so that there is no introduction of outside liquid.

SUMMARY OF THE INVENTION

Briefly, this invention provides a system for purifying metal working liquid coolant in which impure liquid is first directed through a filter which removes gross solids. The filtered liquid passes to a clean tank. Filtered liquid is pumped out of the clean tank to a supply port of a centrifuge. In the centrifuge, tramp oil is separated from solids and from super clean coolant liquid. The solids collect in an outer portion of the bowl of the centrifuge. The super clean coolant is returned to the metal working system. Periodically sufficient super clean coolant liquid is diverted to an inlet for operating liquid of the centrifuge to cause split second opening of bowls of the centrifuge and to permit discharge of solid containing sludge from the centrifuge. The sludge contains a small amount of super clean coolant in which the solids are suspended. The sludge can be returned to the filter to separate the solids from the coolant.

The above and other objects and features of the invention will be apparent to those skilled in the art to which this invention pertains from the following detailed description and the drawings in which:

BRIEF DESCRIPTION OF THE DRAWINGS

In the following detailed description and the drawings, like reference characters indicate like parts.

DESCRIPTION OF PRESENTLY PREFERRED EMBODIMENT

Figure 1:
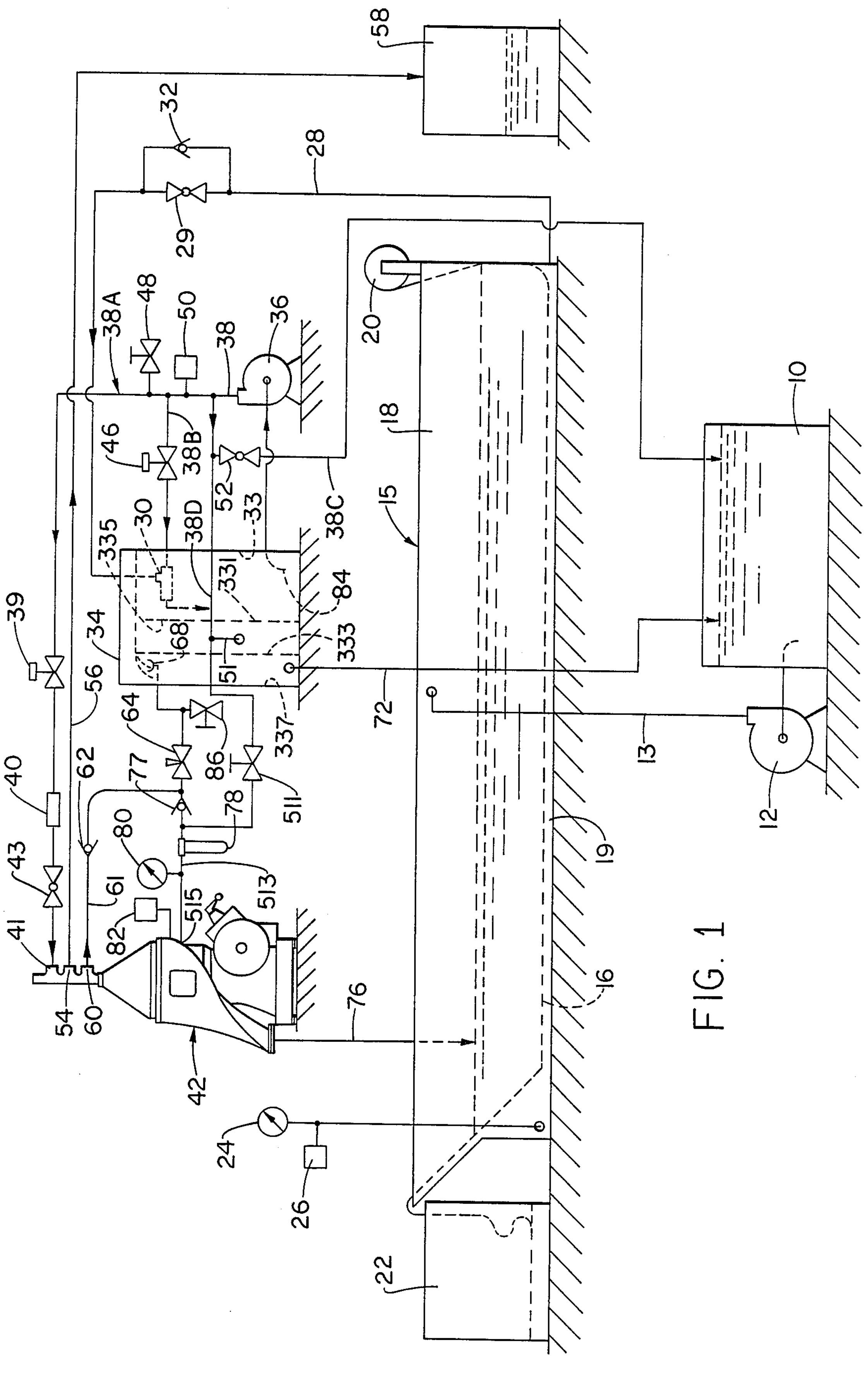
FIG. 1 is a schematic view of a system for purifying coolant which is constructed in accordance with an embodiment of this invention.

In FIG. 1 is shown a coolant purifying system constructed in accordance with an embodiment of this invention.

Used coolant is collected in a dirty liquid tank 10. Dirty liquid from the dirty liquid tank 10 is pumped by a pump 12 to a filter system tank 15 through a line 13.

A filter medium 16 divides the filter system tank 15 into an upper filter system dirty liquid portion 18 above the filter medium 16 and a lower vacuum box 19 below the filter medium 16. The filter medium is supplied from a roll 20 and passes through the filter system tank 15 and is discharged into a discharge hopper 22. Appropriate filter medium drive mechanism (not shown) can be provided to index the filter medium as required. A vacuum gauge 24 indicates the pressure in the vacuum box 19. A vacuum switch 26 can be provided to cause indexing of the filter medium through the operation of the filter medium drive mechanism (not shown).

Clean liquid is drawn from below the filter medium 16 through a line 28 and a manual control valve 29 by action of an ejector 30. The manual control valve 29 controls flow along the line 28 to an ejector 30. A check valve 32 permits return of clean liquid in the line 28 to the vacuum box 19 when the ejector 30 is not operating.

The ejector 30 discharges into a first compartment 33 of a clean liquid tank 34. The clean liquid tank 34 is divided into three compartments by a first baffle 331 and a second baffle 333. The first baffle 331 separates the first compartment 33 from a second compartment 335. The second baffle 333 separates the second compartment 335 from a third compartment 337. The second baffle 333 is higher than the first baffle 331 so that liquid in the second compartment 335 can overflow into the first compartment 33 and liquid in the first compartment 33 and the second compartment 335 can overflow into the third compartment 337. The ejector 30 is powered by clean liquid from the first compartment 33 of the clean liquid tank 34. A pump 36 draws clean liquid from the first compartment 33 of the clean liquid tank 34, and directs the clean liquid along a line 38. From the line 38, the clean liquid is pumped along branch lines 38A, 38B, 38C and 38D. The branch line 38A directs clean liquid under pressure through an automatic valve 39, a flowmeter 40, a manual valve 43, and a centrifuge supply fitting 41 to the interior of a centrifuge 42. The manual valve 43 in the branch line 38A permits adjustment of the flow to the centrifuge 42 from the branch line 38A. The automatic valve 39 opens a selected time after the centrifuge 42 is started to permit flow of clean liquid to the centrifuge 42.

The branch line 38B directs clean liquid under pressure through a valve 46 to the ejector 30 to power the ejector 30. The valve 46 acts automatically to shut off flow through the line 38B during indexing of the filter medium. The ejector 30 discharges filtered clean liquid into the first compartment 33.

A valve 48 connected to the line 38 permits removal of a sample of the liquid in the line 38 as required. A pressure switch 50 connected to the line 38 can cause shut off of power to the pump 36 in the event of inadequate pressure in the line 38.

The branch line 38C directs clean liquid from the pump 36 to the dirty liquid tank 10. A valve 52 in the line 38C controls flow in the branch line 38C.

The branch line 38D directs clean liquid to a sub-branch line 51 which directs clean liquid to the second compartment 335. The branch line 38D also directs clean liquid through a manual valve 511 to a line 513, which connects a pressure port 515 of the centrifuge 42 to an overflow fitting 68. The manual valve 511 is closed except during manual operation of the centrifuge.

The centrifuge 42 separates tramp oil, which is of lower density, from coolant, which is of higher density. Residual small fines collect inside the centrifuge 42 in a portion of the coolant. The tramp oil is discharged through a discharge fitting 54 and a line 56 to a tramp oil receptacle 58. Super clean coolant is discharged from the centrifuge 42 through a discharge fitting 60 and a line 61. A check valve 62 in the line 61 prevents return of super clean coolant to the centrifuge 42. The super clean coolant can pass through a solenoid valve 64 to the overflow fitting 68. The overflow fitting 68 discharges into the third compartment 337 of the clean liquid tank 34. The third compartment 337 also receives clean liquid which overflows the top of the baffle 333. From the third compartment 337 of the clean liquid tank 34, liquid can flow down a line 72 to the dirty liquid tank 10.

A predetermined time after the centrifuge 42 starts operating, the solenoid valve 64 closes. The solenoid valve 64 closes briefly to stop the flow of super clean coolant to the overflow fitting 68 and direct flow of super clean coolant to the pressure port 515 of the centrifuge 42. Liquid pressure in the pressure port 515 causes opening of bowls of the centrifuge 42 to permit discharge of sludge from the centrifuge 42 in a "shoot". The sludge consists chiefly of small solid metal particles suspended in liquid in the centrifuge 42. The sludge is discharged along a line 76 to the dirty liquid portion 18 of the filter system tank 15. The super clean coolant travels through a check valve 77, a filter 78, and a pressure gauge attachment 80 to the pressure port 515 of centrifuge 42. A pressure switch 82 is connected to the centrifuge 42. When the pressure at the pressure switch 82 reaches a predetermined amount, the solenoid valve 64 is opened to permit the pressure in the line 513 to fall permitting closing of the bowls of the centrifuge 42 as the operation of the centrifuge 42 is repeated.

A shoot can be effected by operation of the manual valve 511. When the manual valve 511 is opened, there is pressure at the pressure port 515 of the centrifuge 42 to cause opening of the bowls of the centrifuge 42 to effect the shoot as described above.

Figure 2:
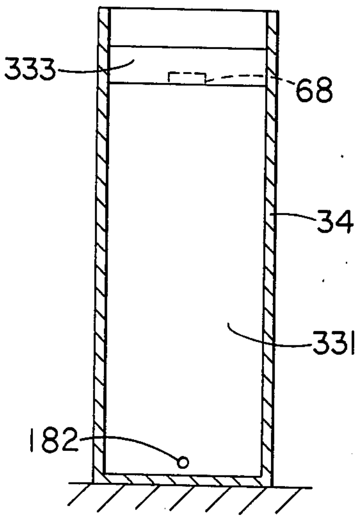
FIG. 2 is a somewhat schematic view in upright section of a clean liquid tank of the system.
Figure 3:
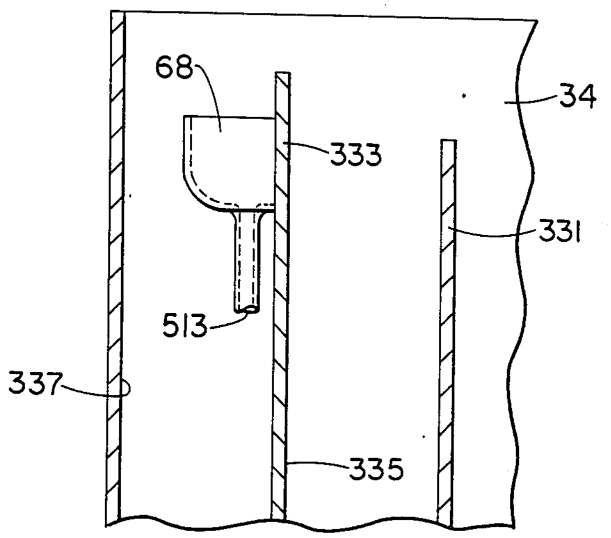
FIG. 3 is a view in upright section showing an overflow fitting and associated portions of the clean liquid tank.

In the event that the supply of liquid to the first compartment 33 of the clean liquid tank 34 fails so that the first compartment 33 is drained by the pump 36, reduced pressure at the pressure switch 50 can cause shut down of the pump 36. A small hole 182 (FIG. 2) is provided in the lower portion of the baffle 331 to permit a portion of the liquid in the second compartment 335 to drain into the first compartment 33 to cover an entry end of a feed line 84 to the pump 36 so that the pump 36 draws liquid when next started.

The overflow fitting 68 is mounted on the baffle 333 in position to receive liquid which passes over the upper edge of the baffle 333 so that liquid is maintained in the line 513 which connects the pressure port 515 to the overflow fitting 68. A manual valve 86 permits securing a sample of liquid in the line 513 adjacent the solenoid 64.

The centrifuge system illustrated in the drawings and described above is subject to structural modification without departing from the spirit and scope of the appended claims.

Having described our invention, what we claim as new and desire to secure by letters patent is:

1. In combination, a centrifuge including means defining a liquid inlet, means defining a first liquid outlet for high density liquid, means defining a second liquid outlet for low density liquid, means defining a discharge means for a shoot of particulate material, and means defining a pressure port for receiving liquid under pressure to cause the shoot; and a sub-combination comprising line means receiving high density liquid from the means defining the first liquid outlet, liquid receiving tank means for receiving high density liquid from said line means, valve means in said line means and a branch line means connecting said line means between the first liquid outlet and the valve means to the means defining the pressure port, whereby, when the valve means is closed, pressure in the centrifuge is increased to cause the shoot.

2. The combination as in claim 1 in which the valve means includes an automatic operating valve which closes a selected time after actuation of the centrifuge, and a pressure switch means connected to the centrifuge which causes opening of the automatic operating valve when the pressure in the centrifuge reaches a selected value.

3. In combination a centrifuge including means defining a liquid inlet, means defining a first liquid outlet for high density liquid, means defining a second liquid outlet for low density liquid, means defining a discharge means for a shoot of particulate material, and means defining a pressure port for receiving liquid under pressure to cause the shoot; and a sub-combination comprising line means receiving high density liquid from the means defining the first liquid outlet, liquid receiving tank means for receiving high density liquid from said line means, valve means in said line means, and a branch line means connecting said line means to the means defining the pressure port, whereby, when the valve means is closed, pressure in the centrifuge is increased to cause the shoot, the liquid receiving tank means including a liquid tank, first and second upright baffles in the liquid tank dividing the liquid tank into a first compartment, a second compartment, and a third compartment, a discharge fitting attached to the line means which discharges into the third compartment, a storage tank, means for draining liquid from the third compartment to the storage tank, a filter assembly equipped with a filter medium, first pump means drawing liquid from the storage tank to be discharged into the filter assembly above the filter medium, an ejector discharging filtered liquid from the filter medium into the first compartment, means for directing liquid from the first compartment to the second compartment, a second pump means drawing liquid from the first compartment to be discharged to the means defining the liquid inlet of the centrifuge and to the ejector to power the ejector, means for directing liquid from the second pump means to the second compartment, means defining an opening in the first baffle in a lower portion thereof to permit liquid in the second compartment to flow into the first compartment in sufficient amount to cover an entry end of a feed line of the second pump means in the event of failure of liquid supply to the first compartment, the liquid in the first compartment and the second compartment overflowing into the third compartment to permit return of liquid to the storage tank.

4. The combination as in claim 3 in which the discharge fitting discharges upwardly and in which the discharge fitting is mounted in the path of liquid overflowing the second baffle so that liquid overflowing the second baffle is caught by the discharge fitting and can flow into the line means to maintain liquid in the line means.

5. The combination as in claim 3 including means directing the shoot into the filter assembly above the filter medium so that particulate material of the shoot can be captured by the filter medium.

6. A combination comprising a centrifuge including means defining a liquid inlet, means defining a first liquid outlet for high density liquid, means defining a second liquid outlet for low density liquid, means defining a discharge means for a shoot of particulate material, and means defining a pressure port for receiving liquid under pressure to cause the shoot, line means for receiving high density liquid from the means defining the first liquid outlet, liquid receiving tank means for receiving high density liquid from said line means, valve· means in said line means, and a branch line means connecting said line means to the means defining the pressure port, whereby, when the valve means is close, pressure in the centrifuge is increased to cause the shoot, the liquid received tank means including a liquid tank, first and second upright baffles in the liquid tank dividing the liquid tank into a first compartment, a second compartment, and a third compartment, a discharge fitting attached to the line means which discharges high density liquid into the third compartment, a storage tank, means for draining liquid from the third compartment to the storage tank, a filter assembly equipped with a filter medium, first pump means drawing liquid from the storage tank to be discharged into the filter assembly above the filter medium, an ejector discharging filtered liquid into the first compartment, means for directing liquid from the first compartment to the second compartment, a second pump means drawing liquid from the first compartment to be discharged to the means defining the liquid inlet of the centrifuge and to the ejector to power the ejector, means for directing liquid from the second pump means to the second compartment, means defining an opening in the first baffle in a lower portion thereof to permit liquid in the second compartment to flow into the first compartment in sufficient amount to cover an entry end of a feed line of the second pump means in the event of failure of liquid supply to the first compartment, the liquid in the first compartment and the second compartment overflowing into the third compartment to permit return of liquid to the storage tank.

7. The combination as in claim 6 in which the discharge fitting discharges upwardly and in which the discharge fitting is mounted in the path of liquid overflowing the second baffle so that liquid overflowing the second baffle is caught by the discharge fitting and can flow into the line means to maintain liquid in the line means.

8. The combination as in claim 6 including means directing the shoot into the filter assembly above the filter medium so that particulate material of the shoot can be captured by the filter medium.

* * * * *